May 6, 1930.  E. E. EATON  1,757,517
VIBRATIONLESS MULTIPLE DISK CLUTCH
Filed Oct. 22, 1927  2 Sheets-Sheet 1

INVENTOR.
Ernest E. Eaton
BY Parsons & Bodell
ATTORNEYS.

May 6, 1930.  E. E. EATON  1,757,517
VIBRATIONLESS MULTIPLE DISK CLUTCH
Filed Oct. 22, 1927   2 Sheets-Sheet 2
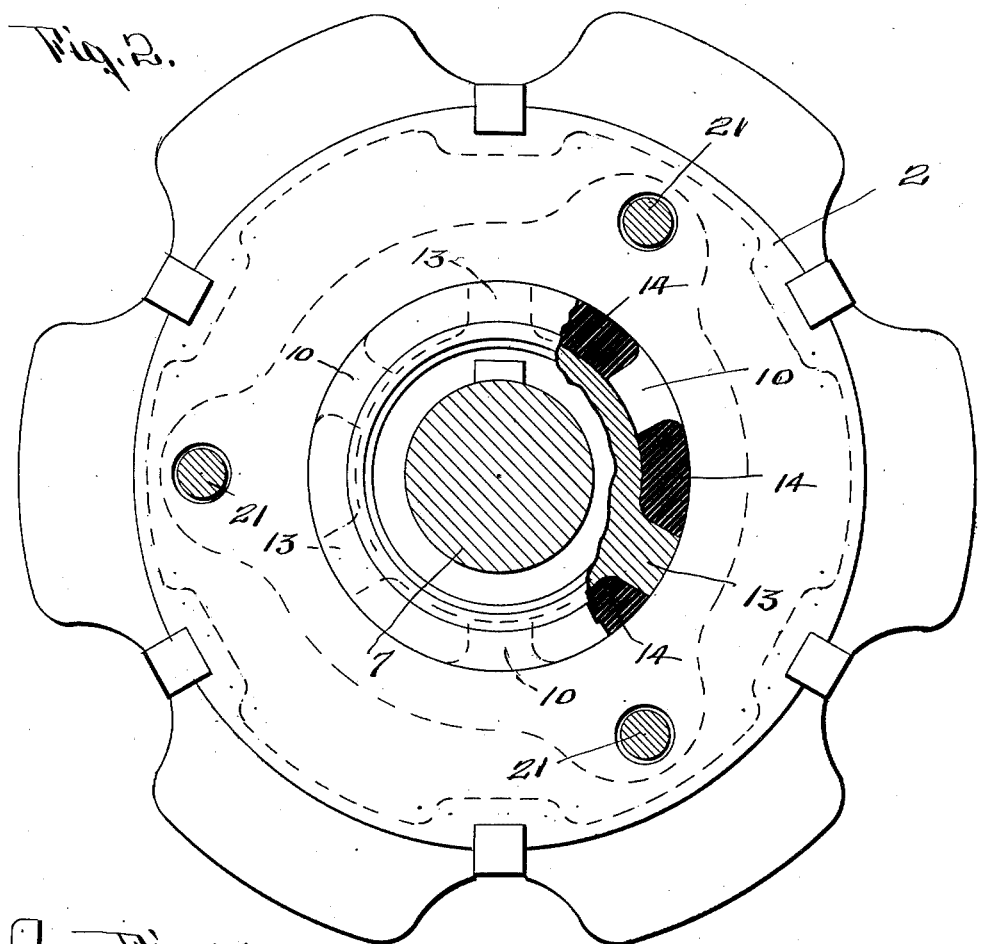
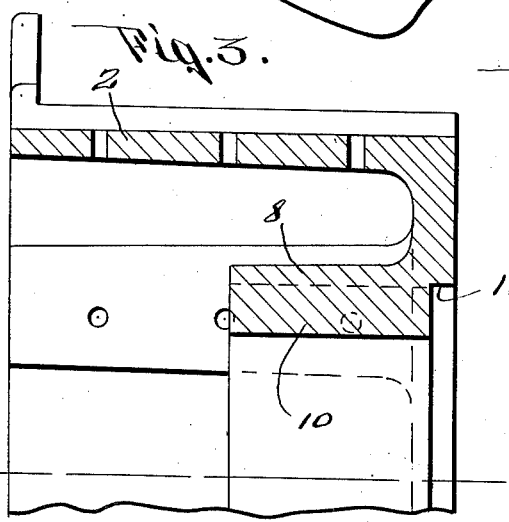
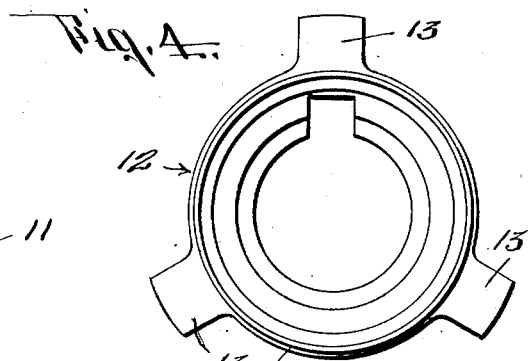

Patented May 6, 1930

1,757,517

UNITED STATES PATENT OFFICE

ERNEST E. EATON, OF SYRACUSE, NEW YORK, ASSIGNOR TO BROWN-LIPE GEAR COMPANY, OF SYRACUSE, NEW YORK, A CORPORATION OF NEW YORK

VIBRATIONLESS MULTIPLE-DISK CLUTCH

Application filed October 22, 1927. Serial No. 228,034.

This invention relates to friction disk clutches and more particularly to multiple disk clutches or clutches which have outer and inner drums and has for its object, means for yieldingly transmitting the torque from the inner clutch drum to the clutch shaft, which means is located within the length of the inner drum so that the over all length of the clutch is not increased over similar clutches not provided with yielding torque transmitting means.

The invention consists in the novel features and in the combinations and constructions hereinafter set forth and claimed.

In describing this invention, reference is had to the accompanying drawings in which like characters designate corresponding parts in all the views.

Figure 2 is an end elevation, parts being omitted of parts seen in Figure 1.

Figure 3 is a detail view of the inner clutch drum.

Figure 4 is an end view of the hub mounted on the clutch shaft.

Figure 1:
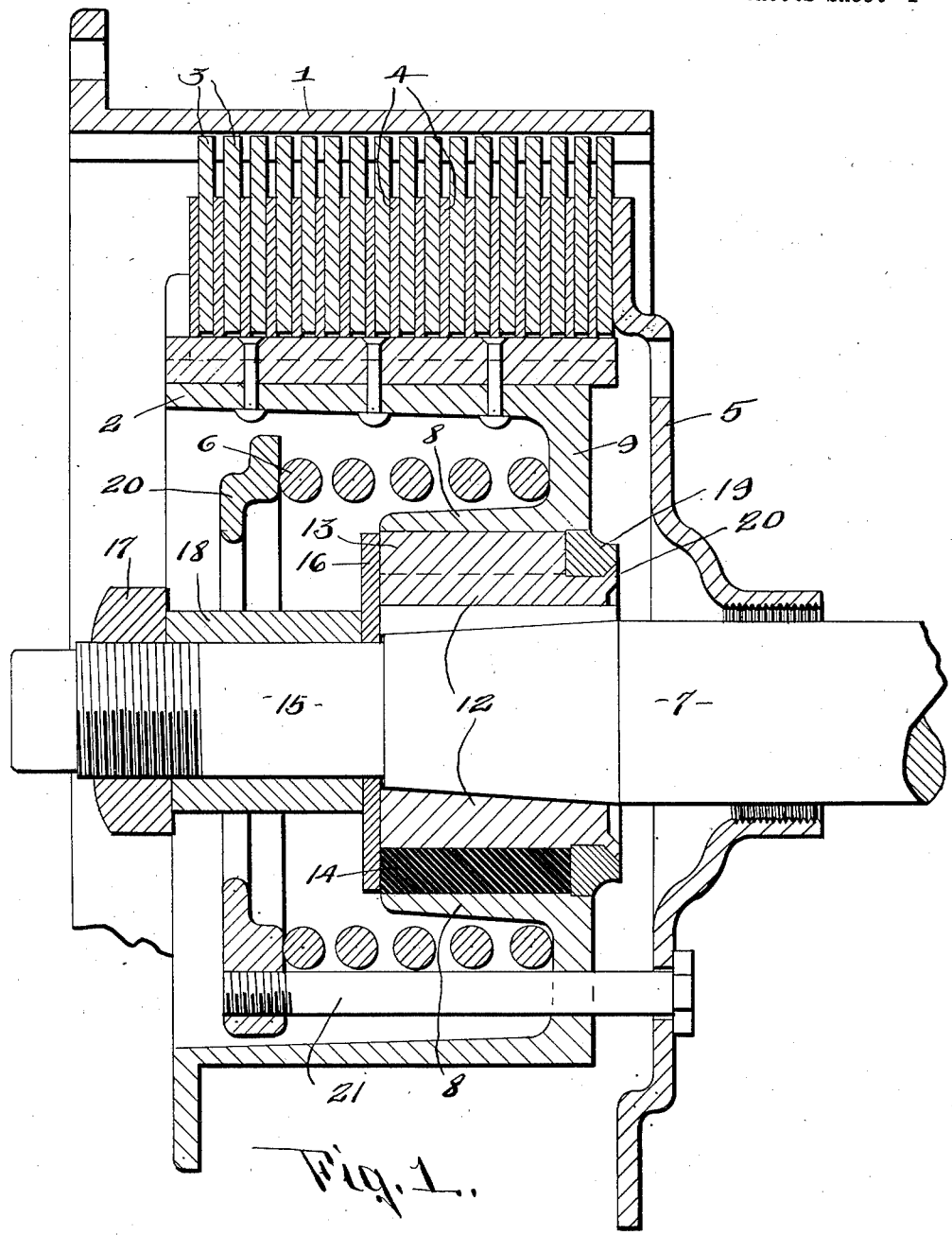
Figure 1 is a vertical fragmentary sectional view of a multiple disk clutch embodying this invention.

This clutch comprises generally, outer and inner drums, a clutch shaft, the usual interleaved disks between the drums and the usual means for engaging and disengaging the same, the inner drum having an internal hub, a second hub mounted on the shaft within the first hub and yielding means for transmitting the torque between the hubs and located within the internal hub of the inner drum.

1 designates the outer drum.

2 is the inner drum.

3 and 4 are the interleaved disks interlocked respectively with said drums.

5 is the pressure plate which is operated to relieve the disks of the pressure of the clutch spring 6 by suitable throw-out mechanism not shown.

7 is the clutch shaft.

The inner drum is provided with an internal hub 8 which projects forwardly from a head or web 9 at the rear end of the drum, the hub being formed with internal lengthwise projections 10 here shown as three in number spaced equidistant apart, these projections terminating short of the rear end of the hub providing an annular recess 11 for a purpose to be presently described.

12 is a hub or collar mounted on the clutch shaft within the hub 8 and having spaced apart peripheral projections 13 extending lengthwise thereof and located between the projections 10. The projections 10 at their free ends terminate close to or have a light bearing on the periphery of the hub 12 and the projections 13 of the hub 12 at their free ends terminate close to or have a bearing on the inner annular wall of the hub 8.

The means for yieldingly transmitting the torque from the drum 9 to the clutch shaft or vice-versa are here shown as blocks 14 of rubber or similar material located between the hubs 8 and 12 and between the projections 10 and 13 thereof substantially filling the spaces between said projections. The yielding material is usually rubber.

The hub 12 is mounted on a tapered part of the shaft, which shaft is formed with a reduced spindle portion 15 at its front end and the space between the hubs 8 and 12 is covered at its front end by a plate or washer 16 on the shaft and thrusting against the ends of the hubs, it being thrust or held against the ends of the hubs by a nut 17 threading on the front end of the shaft 7 and a sleeve 18 interposed between the nut and the plate 16.

The rear end of the space between the hubs is closed by a collar 19 on the hub 12 and located in the recess 11, this collar being held in position in any suitable manner as by spreading or by riveting an annular lip 20 at the rear end of the hub 12 over onto the rear face of the collar. The collar 19 and the plate 16 hold the blocks from spreading.

The clutch spring 6 as here shown is located within the inner drum and interposed between the head or web 9 and the spring abutment 20, the latter being connected to the pressure plate by rods 21.

Owing to the arrangement of the rubber blocks within internal hubs, the length of the clutch is not increased over standard clutches and this clutch can be used in the same situation as the standard clutches.

What I claim is:

1. A multiple disk clutch comprising outer and inner drums, a clutch shaft, interleaved disks between the drums and means for engaging and disengaging the same, the inner drum having an internal hub, a second hub mounted on the shaft within the internal hub and the hub on the inner drum having internal spaced apart projections terminating short of the rear end of the hub providing an annular recess, the hub on the shaft having peripheral projections extending between and spaced from the former projections, blocks of yielding material between the projections on said hubs, a plate mounted on the shaft and abutting against the inner ends of the hubs and forming a front end wall for the space between the hubs, a retaining ring mounted on the inner hub in said recess and forming a rear end wall for the space between the hubs.

2. In a clutch construction, the combination of an inner member, a clutch shaft, said member having a hub, a second hub mounted on the shaft within the former hub, the former hub having internal spaced apart projections terminating short of one end of the hub providing an annular recess, the hub on the shaft having peripheral projections extending between and spaced from the former projections, blocks of yielding material between the projections on said hub, a plate on the shaft and abutting against like ends of the hubs and forming one end wall for the space between the hubs, a retaining ring mounted on the inner hub in said annular recess and forming the other end wall for the space between the hubs.

In testimony whereof, I have hereunto signed my name, at Syracuse, in the county of Onondaga, and in the State of New York, this 12th day of October, 1927.

ERNEST E. EATON.